(12) United States Patent
Mayhew et al.

(10) Patent No.: US 7,967,530 B2
(45) Date of Patent: Jun. 28, 2011

(54) SUB-DUCTING APPARATUS

(75) Inventors: Andrew J Mayhew, Ipswich (GB); Nicholas J Medlen, Ipswich (GB)

(73) Assignee: British Telecommunications public limited company, London (GB)

( * ) Notice: Subject to any disclaimer, the term of this patent is extended or adjusted under 35 U.S.C. 154(b) by 952 days.

(21) Appl. No.: 10/509,888

(22) PCT Filed: Mar. 25, 2003

(86) PCT No.: PCT/GB03/01278
§ 371 (c)(1),
(2), (4) Date: Oct. 1, 2004

(87) PCT Pub. No.: WO03/084019
PCT Pub. Date: Oct. 9, 2003

(65) Prior Publication Data
US 2005/0166340 A1   Aug. 4, 2005

(30) Foreign Application Priority Data

Apr. 2, 2002   (EP) .................................. 02252379

(51) Int. Cl.
*F16L 1/00* (2006.01)
(52) U.S. Cl. .................................................. 405/184.1
(58) Field of Classification Search ............... 405/183.5, 405/184, 184.1, 184.2, 184.3
See application file for complete search history.

(56) References Cited

U.S. PATENT DOCUMENTS

| | | | | |
|---|---|---|---|---|
| 3,217,816 A | * | 11/1965 | Boyer | 175/57 |
| 5,096,000 A | * | 3/1992 | Hesse | 175/22 |
| 5,108,228 A | * | 4/1992 | Miyazaki et al. | 405/184.2 |
| 5,639,183 A | * | 6/1997 | Griffioen et al. | 405/183.5 |
| 5,988,188 A | * | 11/1999 | Born | 134/22.11 |
| 2004/0037649 A1 | * | 2/2004 | Van Bijsterveld et al. | 405/184 |

FOREIGN PATENT DOCUMENTS

| | | |
|---|---|---|
| EP | 0 710 863 | 5/1996 |
| EP | 0710863 A | 5/1996 |

OTHER PUBLICATIONS

Patent Abstracts of Japan, vol. 107, No. 289 (E-1375), Jun. 3, 1993 & JP 05 015026 A (Fujikura Ltd; Others:01), Jan. 22, 1993.
Patent Abstracts F Japan, vol. 2000, No. 26, Jul. 1, 2002, & JP 2001 258115 A (Nippon Telegr & Teleph Corp), Sep. 21, 2001.
Patent Abstracts of Japan, vol. 017, No. 289 (E-1375), Jun. 3, 1993 & JP 05 015026 A (Fujikura Ltd; Others: 01), Jan. 22, 1993.
Patent Abstracts of Japan vol. 2000, No. 26, Jul. 1, 2002 & JP 2001 258115 A (Nippon Tlegr & Teleph Corp), Sep. 21, 2001.

* cited by examiner

*Primary Examiner* — Sunil Singh
(74) *Attorney, Agent, or Firm* — Nixon & Vanderhye P.C.

(57) ABSTRACT

A sub-ducting apparatus comprising a sub-duct, and a remotely operable path-finding head for facilitation of the subduct into a duct. The head is detachable at the end of the subduct and includes an expandable portion or a cutter, as a result of which, twisted or jammed cables may be removed from the duct.

17 Claims, 3 Drawing Sheets

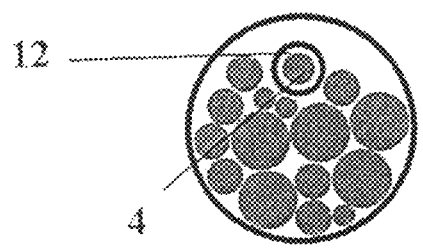
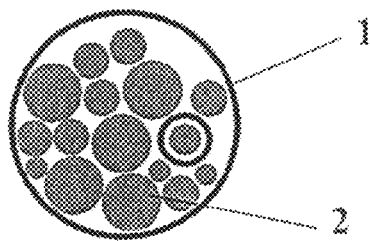
Fig. 1A    Fig. 1B
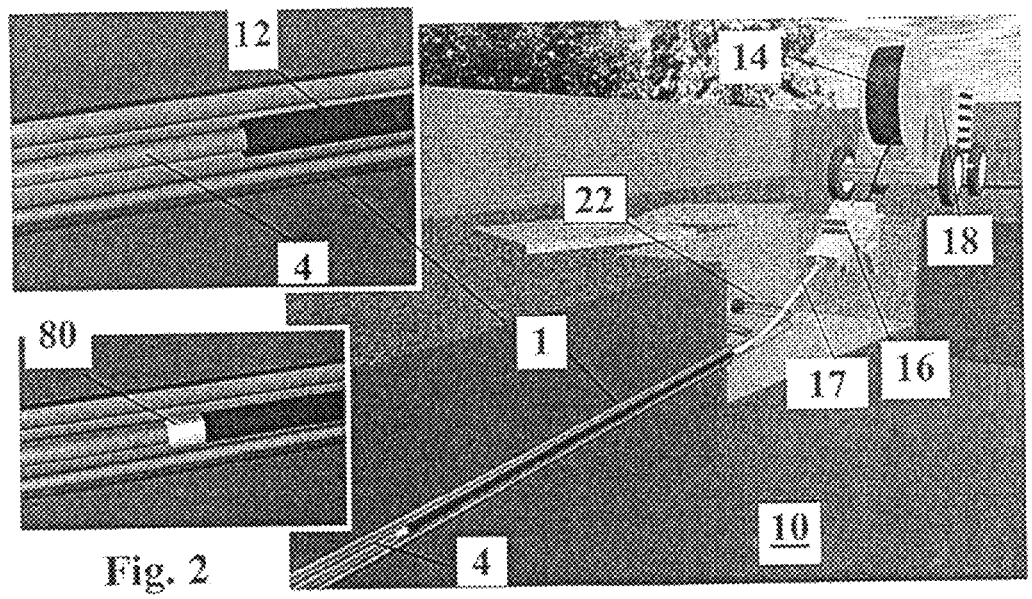
Fig. 2

SUB-DUCTING APPARATUS

This application is the US national phase of international application PCT/GB03/01278 filed 25 Mar. 2003 which designated the U.S. and claims benefit of EP 02252379.9, dated 2 Apr. 2002, the entire content of which is hereby incorporated by reference.

TECHNICAL FIELD

The present invention relates to a sub-ducting apparatus and a method of sub-ducting, and more particularly to a system for accessing cables or other objects in a duct, for installation or removal thereof.

BACKGROUND AND SUMMARY

Telecommunications cables are often located in underground ducts that are accessible at ground level at access points along the length of the duct. Redundant cables can be jammed in the ducts either by becoming adhered to the duct or by having subsequently installed cable twisted around them. Until now, removal of the cables has been facilitated by application of a tensile force to the cable, which might, in some cases, free a jammed cable and allow its extraction. However, if the cable cannot be easily extracted in this way, applying tensile force can damage the duct and/or the other cables within the duct, resulting in costly and time-consuming repair work or even discarding of the damaged cables and/or duct. Removal of redundant cables reclaims valuable duct space that can then be used to install new cables. The high cost of installing new ducts can be delayed if optimal use is made of the duct space.

It is an object of the present invention to alleviate these problems in a simple and effective manner. The invention is as stated in the appended claims. An advantage of using a path-finding element is that jammed cables can be eased and separated away from other cables or from the duct without damaging the other cables or the duct itself. An additional advantage is that there is significantly less risk of breaking the redundant cable. The path-finding element or head is remotely operable such that it may be controlled from outside the duct to negotiate the obstructions it encounters inside the duct. Longer lengths of duct are accessible than would be without the head. The path-finding head may be detachable so that a head may be removed and changed, such that the appropriate head for the particular job concerned can be attached. The head may be outwardly deformable, so as to expand and gently push cables or other obstructions out of the way without damaging them. The head may include a seal activated by pressurisation of the sub-duct. The seal enables the trapping of gas inside the head so as to facilitate the expansion of the deformable head.

The head may include a cutting portion at its front end, allowing the head to cut through an obstruction or enable the release of a cable that has become adhered to the duct.

The cutter may be a chisel head cutter for chiselling through small gaps between cables or between the cable and the duct, allowing gentle cutting or displacement of the obstruction.

The cutter may be a rotational cutter for cutting through obstructions where required. The rotational cutter is activated by relative movement of the sub-duct and the cutter. A helical thread translates linear movement of the sub-duct to rotational movement of the cutter. In this manner a rotational cutting action may be achieved simply and effectively by a reciprocating motion of the sub-duct.

BRIEF DESCRIPTION OF THE DRAWINGS

The present invention will now be explained in more detail by the following non-limiting description of a preferred embodiment and with reference to the accompanying drawings, in which:

FIGS. 1A and 1B are schematics of an end view of a duct containing cables, illustrating the purpose of the invention;

FIG. 2 is a perspective view of an embodiment of the invention in operation;

DETAILED DESCRIPTION

Figure 3A:
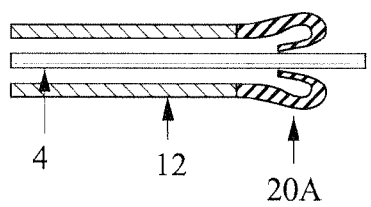
FIGS. 3A and 3B are schematics of a first path-finding head according to the invention.

FIG. 1A shows an end view of a duct 1 containing a plurality of cables 2, and indicating a cable to be removed 4. FIG. 1B shows the same duct from the other end. Cables 2 have been twisted and the cable to be removed 4 is intertwined between other cables. The duct 1 is located underground and is accessible at ground level at access points along the length of the duct. The access ports are generally spaced up to 250 m intervals. The sub-ducting apparatus 10 is thus required to enable sub-ducting operations to be conducted over this distance, without damaging the other cables 2 in the duct or the duct 1 itself.

The sub-ducting apparatus 10 consists of a length of sub-duct 12 and one or more detachable heads 20. Additional equipment includes a drum 14, a linear engine 16, and a compressor 18. FIG. 2 shows the sub-duct 12 wound onto the drum 14, positioned nearby an access point 22. The sub-duct is an elongate sleeve manufactured from polyethylene or other similar material. FIG. 2 shows a sub-duct having a circular cross-section, however other cross-sections of sub-duct may be used. The sub-duct 12 bore is preferably slightly larger than that of the redundant cable 4 to create a clearance gap so as to minimise friction such that the sub-duct 12 may be sleeved over the cable 4. The drum 14 is preferably portable and contains a length of sub-duct 12 wound around it. The free end of the sub-duct 12 may be advanced towards the duct and through it by a linear engine 16. The engine may have a guide portion 17 for guiding the sub-duct into the duct 1.

The path-finding elements 20 are heads that can be detachably fitted at the end of the sub-duct 12. There may be several different types of path-finding head, each designed to perform a task to ease, cut, or otherwise negotiate a path through the obstruction in the duct.

Figure 3B:
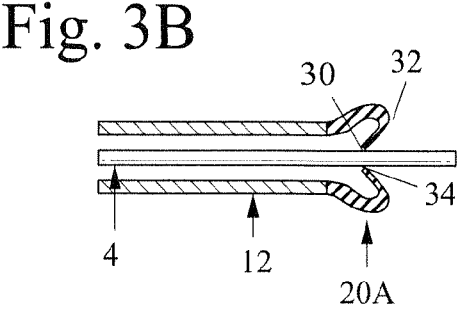

Path-finding head 20A may be utilised for easing a path through twisted or jammed cables 2 such that the cables 2 do not become damaged. As seen in FIG. 3A, the head is deformable and is detachably fixed to the sub-duct 12. The deformable head 20A is preferably manufactured from a hardwearing, flexible and elastic material. The head 20A forms a sleeve, through which the cable 4 extends. The sleeve 20A profile shown in FIG. 3A and FIG. 3B would be optimised to perform its task and is illustrated for example only. The sleeve 20A profile U-turns in on itself such that the end 30 of the sleeve faces back down the sub-duct, producing a rounded front 32 to the head 20A. The profile is designed such that whilst the sub-duct 12 is advanced along the cable 4, the flexible head is not in contact with the cable 4, allowing the duct to pass over the cable with minimum friction. However, in the event of finding another cable 2 obstructing the path of the advancing sub-duct 12, the head can be pressurised to expand as shown in FIG. 3B. Compressed gas from the compressor 18 is fed through the sub-duct 12 and into the path-finding head 20A. The expansion of the head 20A is facilitated by the sleeve bending outward such that the sleeve end 30 contacts and creates a seal 34 against the cable 4. The pressurised seal 34 enables the expanded head 20A to gently force the cables 2 away from the cable 4 allowing further advancement of the sub-duct 12 where known prior art methods of cable removal require brute force to be applied to unjam or untwist the cables 2. The path-finding head 20A therefore minimises or eliminates damage to the cables 4.

Figure 4A:
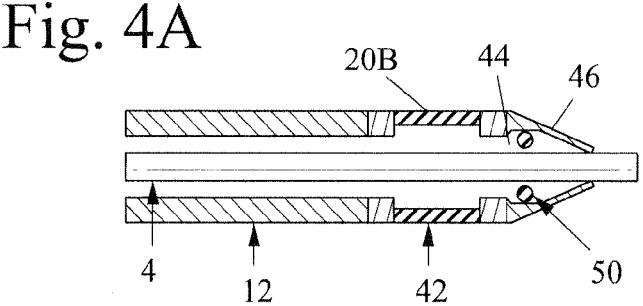
FIGS. 4A and 4B are schematics of a second path-finding head according to the invention.
Figure 4B:
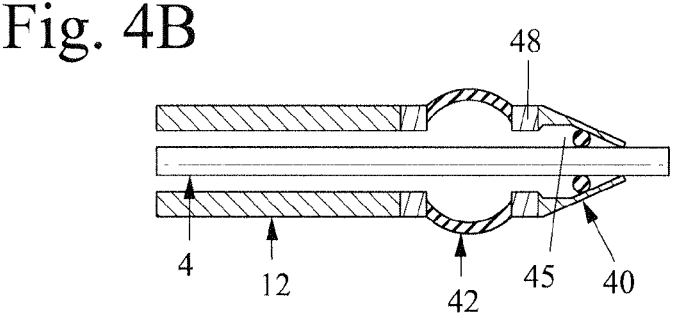

Path-finding head 20B, seen in FIG. 4A also includes a pressure seal 40. The head 20B comprises an expandable section 42 and a front portion 44. The expandable section 42 is located behind the front portion 44. The front portion 44 comprises a chisel portion 46 manufactured from rubber, inside of which is a rubber ring 50. The rubber ring 50 is unattached to the head 20B. At the base of the rubber chisel portion is a shoulder portion 48 forming an annulus of rubber material of thickness greater than that forming the chisel portion 46. When the head 20B is fitted to the sub-duct 12 and sleeved over a cable 4, the rubber ring 50 is trapped in the chamber 45 formed between the rubber chisel head 46 and the cable 4, and is prevented from leaving the chamber 45 by shoulder portion 48. The pressure seal 40 of head 20B is activated by pressurisation of the sub-duct 12, preferably by application of a compressed gas through the sub-duct 12 and into the head 20B. FIG. 4B shows the head 20B after pressurisation of the sub-duct 12 and head 20B. The expandable section 42 deforms outwardly, decreasing the overall length of the head 20B. The front portion 44 is hence retracted towards the sub-duct 12, decreasing the width of the gap in which the rubber ring 50 is trapped, until the rubber chisel head 46 and rubber ring 50 come into frictional contact to create the pressure seal 40. The head 20B has the advantage that the expandable section 42 eases cables away from the cable 4, and the rubber chisel portion 46 can chisel through small gaps between obstructing cables 2.

Figure 5:
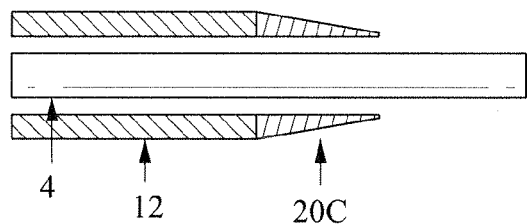
FIG. 5 is a schematic of a third path-finding head according to the invention.

Path-finding head 20C is shown in FIG. 5. The head consists of a chisel cutter manufactured from tool steel or similar hardwearing tool material. In use, the head 20C surrounds the cable 4 and the chisel cutter may be employed for freeing a cable 4 that has adhered to the duct, by chiselling between the cable 4 and duct 1. The chiselling is achieved by applying a force to the sub-duct 12 at the access point 22. In some situations, reciprocating movement of the chisel head 20D may be necessary to provide effective chiselling, and may be achieved by a reciprocating movement of the subduct. Path-finding head 20C may also be suitable for guiding the sub-duct 12 through small gaps between cables 2.

Figure 6A:
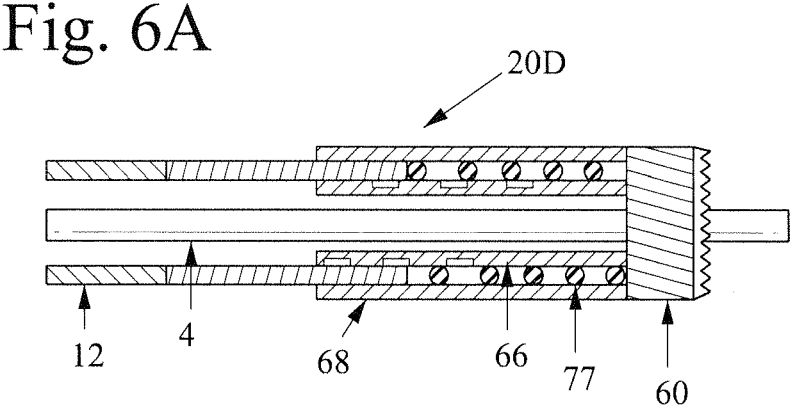
FIGS. 6A and 6B are schematics of a fourth path-finding head according to the invention.
Figure 6B:
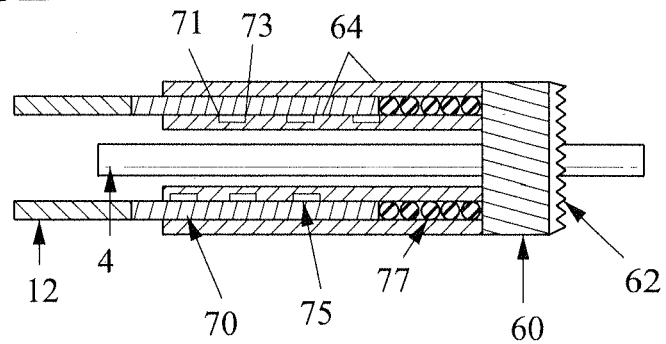

Path-finding head 20D shown in FIGS. 6A and 6B, comprises a rotational cutter 60 at the front of the head. The rotational cutter 60 is cylindrical and manufactured from tool steel or other such hardwearing tool material, and includes a ring of teeth 62 at the front thereof. The teeth 62 of the cutter 60 therefore face the direction of sub-duct advancement. Extending rearwardly from the rotational cutter 60 is a double sleeve portion 64 having an inner sleeve 66 and an outer sleeve 68, extending away from the rotational cutter 60. A third sleeve 70 is insertable into the double sleeve 64. A helical thread 75 is formed on the surface 73 of the inner sleeve 66 and a lug on the inner surface 71 of the third sleeve 70 projects into it. A helical spring 77 is coiled around the inner sleeve 66 such that it occupies the gap between the inner sleeve 66 and the outer sleeve 68, and biases the third sleeve 70 away from the cutter 60.

In use, the third sleeve 70 is attached to the sub-duct 12. The cable 4 passes through the inner sleeve 66 and through the rotational cutter 60. FIG. 6A shows the head 20D attached to the sub-duct 12. Whilst the sub-duct 12 is advanced along the cable 4, the spring 77 is relaxed. In the event of requiring the cutter 60 to cut away an adhered or jammed cable 4, a force must be applied to the sub-duct 12 to produce reciprocating movement of the sub-duct 12. The linear motion of the sub-duct 12 transfers the motion directly to the third sleeve 70, and the engagement of the lug with the helical thread 75 ensures that as the third sleeve 70 advances, the inner sleeve 66 rotates, thus rotating the cutter. Cutting takes place during the advancement of the head 20D. The advancing third sleeve 70 compresses the helical spring 77 as shown in FIG. 6B. Releasing the force applied to the sub-duct 12 releases the spring 77 and the mechanism returns to rest as shown in FIG. 6A. Cutting ceases during retraction of the head 20D. Repeatedly applying and releasing force on the sub-duct 12 hence provides an intermittent rotational cutting motion. This could be achieved manually, but could be more effective if applied with a pushing machine (not shown). Thus an advantage of path-finding head 20D is that linear motion is translated via the helical thread 75 to rotating motion so as to facilitate the rotational cutter 60. Compressed gas may be applied to the obstruction whilst using the cutting heads 20C and 20D to assist removal of the obstruction.

Operation of the sub-ducting apparatus 10 involves unwinding the sub-duct 12 from the drum 14 and feeding it into the duct 1. The sub-duct 12 is pushed, or sleeved, over and along the redundant cable 4. The sub-duct 12 may be pushed in by hand or with the assistance of the linear engine 16. It is recommended that the duct be surveyed for potential obstructions as much as possible prior to the insertion of the sub-duct 12, in order to assess which type of path-finding head 20 will be required to overcome the obstruction. The path-finding head 20 may then be activated as necessary, for instance by applying a force to the sub-duct 12 or by applying a compressed gas from the compressor 18 at the access point 22 through the access point end of the sub-duct 12. Once the obstructing cable 2 has been eased or unjammed, or the cable 4 has been freed from the duct 1, and the sub-duct 12 reaches the end of the redundant cable 4, the cable 4 is pulled out. If this proves to be difficult, compressed gas may be applied again at the access point 22 to assist removal of the cable 4. Once the cable 4 is removed from the duct 1, the sub-duct 12 may be cut and left in the duct 1 for use as a sub-duct, or it may be used to pull in another cable. Thus the sub-ducting apparatus 10 may be used to install new cables.

The sub-ducting apparatus may also be used for installation of sub-ducts. Established sub-duct installation methods require a length of flexible rod to which a rope is attached to be inserted into the duct. The sub-duct is attached to the end of the rope, and pulling the rope pulls the sub-duct into the duct. However the path-finding heads 20A and 20B of the present sub-ducting apparatus can be used to ease cables out of the way in a crowded duct. This would enable a sub-duct to be installed where the friction between the sub-duct and any twisted cables would prevent the utilisation of established sub-duct installation methods.

Where a path-finding head is not required, a metallic sub-duct protector 80, seen in FIG. 2, may be attached at the advancing end of the sub-duct so as to avoid damage to the end of the sub-duct or to other cables.

It will be understood by the person skilled in the art that any appropriate materials may be used for the sub-duct apparatus components. The sub-ducting apparatus can be used to remove or install cables or for installing sub-ducts. The invention may apply to types of cable other than telecommunications cable. Other types of cutting and easing heads may be used as part of the sub-ducting apparatus. The linear engine may include any type of engine or motor.

The invention claimed is:

1. A sub-ducting apparatus for removing from a duct a cable which is jammed within the duct by an obstruction, comprising a sub-duct and a remotely operable path-finding element comprising easing means and/or cutting means, in use arranged to negotiate a path around or through the obstacle, whereby the sub-duct is inserted into the duct over the jammed cable.

2. An apparatus as claimed in claim 1 in which the sub-duct is an elongate sleeve.

3. An apparatus as claimed in claim 1 wherein the path-finding element is a path-finding head.

4. An apparatus as claimed in claim 3 wherein the head is detachable.

5. An apparatus as claimed in claim 4 in which the head includes a seal activated by pressurisation of the sub-duct.

6. An apparatus as claimed in claim 3 in which the head is outwardly deformable.

7. An apparatus as claimed in claim 6 in which the head is outwardly deformable at the front end.

8. An apparatus as claimed in claim 6 in which the head is outwardly deformable at a portion set back from the front end.

9. An apparatus as claimed in claim 1 in which the head has a cutting portion at the front end.

10. An apparatus as claimed in claim 9 in which the cutting portion is a chisel portion.

11. An apparatus as claimed in claim 9 in which the cutting portion is a rotational cutter.

12. An apparatus as claimed in claim 11 in which the cutter is activated by relative movement of the sub-duct and the cutter.

13. An apparatus as claimed in claim 12 in which a helical thread translates linear movement of the sub-duct to rotational movement of the cutter.

14. An apparatus for advancing a sub-duct into a main duct comprising apparatus as claimed in claim 1 and means for advancing it.

15. An apparatus according to claim 1 in which the sub-duct is inserted into the duct so that it sleeves over a cable within the duct for subsequent removal of the cable from the duct.

16. A method of removing from a duct a cable which is jammed within the duct by an obstruction, comprising inserting a sub-ducting apparatus into the duct over the jammed cable, the sub-ducting apparatus comprising a sub-duct and a remotely operable path-finding element comprising easing means and/or cutting means, and remotely operating the path-finding element to negotiate a path around or through the obstacle, whereby the sub-duct is inserted into the duct over the jammed cable.

17. A method according to claim 16 in which the advancement of the sub-duct so that it sleeves over a cable within the duct for subsequent removal of the cable from the duct.

* * * * *